Sept. 15, 1942.

K. A. BEIER 2,295,627

FLUID SEALING DEVICE

Original Filed Sept. 8, 1936

INVENTOR.
KURT A. BEIER.
BY Lockwood, Goldsmith & Galt,
ATTORNEYS.

Patented Sept. 15, 1942

2,295,627

UNITED STATES PATENT OFFICE 2,295,627

FLUID SEALING DEVICE

Kurt A. Beier, Indianapolis, Ind., assignor to Schwitzer-Cummins Company, Indianapolis, Ind., a corporation Original application September 8, 1936, Serial No. 99,763, now Patent No. 2,250,348, dated July 22, 1941. Divided and this application July 5, 1941, Serial No. 401,165

2 Claims. (Cl. 286—11)

This invention relates to an improvement in fluid sealing devices particularly adapted for use in connection with water pumps or similar devices having a shaft extending into a fluid chamber. As applied to a rotary shaft, it is adapted to retain the fluid within the fluid chamber, and eliminate or minimize leakage from the fluid chamber about the shaft. This application is a division of my application Serial No. 99,763, filed September 8, 1936, entitled "Fluid sealing device," now Patent No. 2,250,348, issued July 22, 1941.

The invention resides in the provision of a fluid seal employing a flexible sealing sleeve for permitting longitudinal movement of the sealing members with all metallic parts, as well as the entire pump shaft, out of contact with the fluid, and wherein the seal is also normally out of contact with the shaft.

Figure 1:
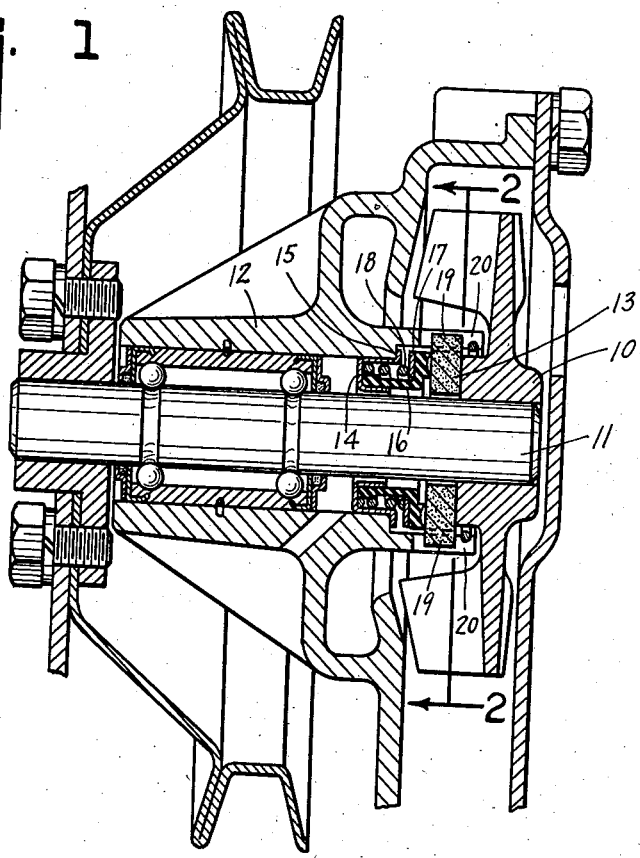
Figure 2:
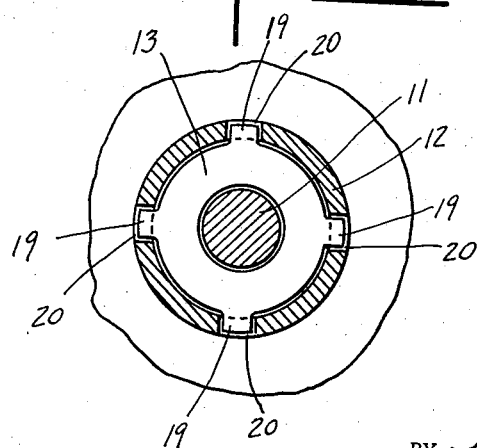

Other features of the invention will be apparent from the following description and claims and the accompanying drawing:

Fig. 1 is a central longitudinal section through a portion of a fluid pump showing the fluid seal. Fig. 2 is a section taken on the line 2—2 of Fig. 1.

One form of the invention is illustrated in the accompanying drawing wherein there is shown a pump impeller 10 which may be keyed or otherwise secured to an impeller shaft 11, said shaft being rotatably supported in the bearing housing 12.

The fluid seal is positioned within the bearing housing 12 and abuts the end of the impeller 10 in sealing engagement therewith. Said seal comprises a washer 13 formed preferably of carbon or a suitable carbon composition which freely surrounds the shaft 11 with one surface in sealing engagement with the end of the impeller 10. Also freely surrounding said shaft and normally out of contact therewith there is a metal spring retaining member in the form of a cup 14 which has a tight fit within the housing 12. Said cup is formed with an outer flanged wall extending over and spaced from an inner shaft embracing tubular portion. The outer wall of the cup is provided with an outwardly extending flange terminating in an enlarged portion of the bearing housing so as to bear in sealing engagement with the shoulder 13 as well as the barrel of the housing.

A flexible sleeve is preferably formed of rubber, synthetic rubber or a suitable rubber composition. It is provided with an enlarged ring bearing against the inner surface of the cup 14 and an enlarged outer ring or flange of greater diameter bearing against the washer 13. A second spring retaining member in the form of a metal ring 17 lies against the inner surface of the outer sleeve flange to retain the spring 18 under tension against the cup 14.

The spring 18 acts to maintain the washer 13 in sealing contact with the impeller 10 and the outer sleeve flange in sealing contact with the washer. Fluid is sealed from contact with the shaft by reason of the several sealing surfaces above mentioned.

The seal, including the washer, sleeve and spring retainers, remains stationary with the bearing housing. For this purpose, the washer 13 is provided with four radially extending lugs 19 slidably mounted in the keyways 20 provided in the end of the housing bearing. Said keyways permit free longitudinal movement of the washer relative to the bearing housing, said flexible sleeve compensating therefor under tension of the spring 18.

It will be noted that there is no metallic contact between the seal and shaft, the rubber sleeve being spaced therefrom.

The flexibility of the intermediate portion of the sleeve freely permits of longitudinal variations and misalignment of the washer, bearing surface and shaft without affecting their sealing relation and without any fluid or metallic contact with the shaft, and also without any contact therewith by the rubber or rubber composition sleeve.

The invention claimed is:

1. In a fluid seal, the combination with a rotatable structure, a shaft therefor and a bearing housing having a through bore spaced from said shaft and provided with a radially extending shoulder, of a washer surrounding said shaft in sealing contact with said structure, a flexible sleeve surrounding and spaced from said shaft having a flanged end in sealing engagement with said washer, a spring retaining member bearing against said flanged end, a spring retaining cup surrounding said shaft in spaced relation thereto and seated within the bore of said housing, said cup being U-shaped in cross section and provided with an outwardly extending flange seated against said shoulder, and a compression spring surrounding said sleeve with one end extending within and a bearing against said cup and the other end bearing against said retaining member for exerting sealing pressure against said washer and shoulder.

2. In a fluid seal, the combination with a rotatable structure, a shaft therefor and a bearing housing having a through bore spaced from said shaft and provided with a radially-extending shoulder, of a sealing washer surrounding said shaft in sealing contact with said structure, a flexible sleeve surrounding and spaced from said shaft having a flanged end in sealing engagement with said washer, a spring retaining cup seated within the bore of said housing in sealing engagement with the opposite end of said sleeve, said cup being formed with an outer flanged wall extending over and spaced from an inner tubular portion surrounding and spaced from said shaft, the outer wall of said cup being provided with an outwardly extending flange extending into sealing engagement with the shoulder of said housing, and a compression spring surrounding said sleeve with one end extending within and bearing against said cup and the other end bearing against the flanged end of said sleeve for exerting sealing pressure against said washer and shoulder.

KURT A. BEIER.